(12) United States Patent
Zhao et al.

(10) Patent No.: US 11,669,445 B2
(45) Date of Patent: Jun. 6, 2023

(54) METHOD FOR ESTABLISHING HIERARCHICAL LOOK-UP TABLES AND/OR INQUIRING MEMORY ADDRESS ACCORDING TO HIERARCHICAL LOOK-UP TABLES

(71) Applicant: REALTEK SEMICONDUCTOR CORPORATION, Hsinchu (TW)

(72) Inventors: Shi-Yao Zhao, Suzhou (CN); Dao-Fu Wang, Suzhou (CN); Yong-Peng Jing, Suzhou (CN)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 87 days.

(21) Appl. No.: 17/380,064

(22) Filed: Jul. 20, 2021

(65) Prior Publication Data

US 2022/0147449 A1    May 12, 2022

(30) Foreign Application Priority Data

Nov. 10, 2020    (CN) .......................... 202011248893.3

(51) Int. Cl.
  *G06F 12/02* (2006.01)
  *G06F 3/06* (2006.01)

(52) U.S. Cl.
  CPC ........ *G06F 12/0292* (2013.01); *G06F 3/0604* (2013.01); *G06F 3/0631* (2013.01); *G06F 3/0659* (2013.01); *G06F 3/0679* (2013.01); *G06F 12/0246* (2013.01); *G06F 2212/7201* (2013.01)

(58) Field of Classification Search
  CPC ............... G06F 12/0292; G06F 3/0604; G06F 3/0631; G06F 3/0659; G06F 3/0679; G06F 12/0246; G06F 2212/7201; G06F 2212/651; G06F 12/1009; G06F 12/0646; G06F 12/0882
  See application file for complete search history.

(56) References Cited

U.S. PATENT DOCUMENTS

| | | | |
|---|---|---|---|
| 10,983,722 B2* | 4/2021 | Kim | H04L 9/3247 |
| 2006/0161719 A1* | 7/2006 | Bennett | G06F 9/45558 711/6 |
| 2016/0274797 A1* | 9/2016 | Hahn | G06F 3/0626 |
| 2017/0109089 A1* | 4/2017 | Huang | G06F 3/0625 |
| 2019/0108131 A1* | 4/2019 | Lee | G06F 3/0614 |
| 2020/0089617 A1* | 3/2020 | Onishi | G06F 12/0246 |
| 2020/0334159 A1* | 10/2020 | Lee | G06F 3/0659 |

* cited by examiner

*Primary Examiner* — Tasnima Matin
(74) *Attorney, Agent, or Firm* — WPAT, P.C

(57) ABSTRACT

A method performed by a slave device to obtain a host memory address includes: inquiring a description list to obtain information of an allocated memory of a host; dividing the allocated memory into N storage spaces according to the information; using a first memory space of the N storage spaces to store a first level look-up table indicating physical addresses of the N storage spaces; dividing the first memory space into M storage spaces; storing a second level look-up table in the slave device to indicate physical addresses of the M storage spaces; inquiring the second level look-up table according to a logical address and obtaining a first index indicating a physical address of one of the M storage spaces; and inquiring the first level look-up table according to the first index and obtaining a second index indicating a physical address of one of the N storage spaces.

17 Claims, 7 Drawing Sheets

METHOD FOR ESTABLISHING HIERARCHICAL LOOK-UP TABLES AND/OR INQUIRING MEMORY ADDRESS ACCORDING TO HIERARCHICAL LOOK-UP TABLES

BACKGROUND OF THE INVENTION

1. Field of the Invention

The present invention relates to a memory address inquiry method, especially to a method for establishing hierarchical look-up tables and/or inquiring a memory address according to hierarchical look-up tables.

2. Description of Related Art

A host memory buffer (HMB) is a memory space of a host allocated to a slave device. When an HMB of a host is allocated to a slave device, the HMB is dedicated to the slave device for a read or write operation, and the host is prohibited from changing the descriptor list of the HMB and prohibited from changing the data stored in the HMB. The introduction of an HMB is especially useful for reduction of latency of the data exchange between a slave device and a host, and useful for reduction of access time.

FIG. 1 shows the principle of an HMB descriptor list. As shown in FIG. 1, a host provides scattered memory pages 110 as an HMB for a slave device, and describes these scattered memory pages 110 in an HMB descriptor list 120. When the slave device wants to access the HMB, the slave device needs to inquire the memory address and the amount of data to be read/written for the present access operation from the HMB descriptor list 120, and then the slave device can arbitrarily access the HMB. Normally, an HMB descriptor list is maintained by a host and stored in the host.

FIG. 2 shows how the firmware of a slave device and the hardware of the slave device in the system of a general system on a chip (SoC) cooperate to access an HMB. As shown in FIG. 2, the firmware of the slave device converts the HMB descriptor list into a logical to physical address look-up table 210, and stores this look-up table 210 in a memory space of the slave device. Afterward, the hardware of the slave device can inquire a physical address from the look-up table 210 according to a logical address of consecutive logical addresses 220 provided by the firmware of the slave device, and then the hardware of the slave device can access scattered memory spaces 230 of the HMB according to the physical address. The merit of the above-mentioned method is that the firmware of the slave device can manipulate consecutive logical addresses without much intervention of software; however, when the look-up table 210 contains too many entries, the hardware of the slave device needs to consume a lot of resources to determine the mapping of the logical address, and this degrades the performance of the slave device and nullifies the advantages of an HMB.

SUMMARY OF THE INVENTION

An object of the present disclosure is to provide a method for establishing hierarchical look-up tables and/or inquiring a memory address according to hierarchical look-up tables.

An embodiment of the method of the present disclosure is for establishing hierarchical look-up tables and inquiring a physical address of an allocated memory of a host according to the hierarchical look-up tables. This embodiment is performed by a slave device coupled to the host and includes the following steps: inquiring a host memory buffer descriptor list (HMB descriptor list) stored in the host and thereby learning about information of the allocated memory; dividing the allocated memory into N storage spaces according to the information of the allocated memory, wherein the N is an integer greater than two; storing a first level look-up table in the N storage spaces, wherein the first level look-up table is used for indicating physical addresses of the N storage spaces, and the first level look-up table occupies a first memory space; dividing the first memory space into M storage spaces, wherein the M is an integer greater than one, and the M is smaller than the N; storing a second level look-up table in the slave device, wherein the second level look-up table is used for indicating physical addresses of the M storage spaces; determining a logical address; inquiring the second level look-up table according to the logical address and thereby obtaining a first index indicating a first physical address of a first storage space of the M storage spaces; and inquiring the first level look-up table according to the first index and thereby obtaining a second index stored in the first storage space, wherein the second index indicates a physical address of one of the N storage spaces.

An embodiment of the method of the present disclosure is for establishing hierarchical look-up tables that are used for inquiring a physical address of an allocated memory of a host. This embodiment is performed by a slave device coupled to the host and includes the following steps: inquiring a host memory buffer descriptor list (HMB descriptor list) stored in the host and thereby learning about information of the allocated memory; dividing the allocated memory into N storage spaces according to the information of the allocated memory, wherein the N is an integer greater than two; storing a first level look-up table in the N storage spaces, wherein the first level look-up table is used for indicating physical addresses of the N storage spaces, and the first level look-up table occupies a first memory space; dividing the first memory space into M storage spaces, wherein the M is an integer greater than one, and the M is smaller than the N; and storing a second level look-up table in the slave device, wherein the second level look-up table is used for indicating physical addresses of the M storage spaces.

An embodiment of the method of the present disclosure is for inquiring a physical address of an allocated memory of a host according to hierarchical look-up tables. This embodiment is performed by a slave device coupled to the host and includes the following steps: determining a logical address; inquiring a second level look-up table according to the logical address and thereby obtaining a first index indicating a first physical address of a first storage space of M storage spaces, wherein the second level look-up table is stored in the slave device, and the M is an integer greater than one; and inquiring a first level look-up table according to the first index and thereby obtaining a second index stored in the first storage space, wherein the second index indicates a physical address of one of N storage spaces, the first level look-up table is stored in the N storage spaces, the N storage spaces belong to the allocated memory of the host, the N is an integer greater than the M, and the first level look-up table occupies a memory space equal to a sum of the M storage spaces.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a method for establishing hierarchical look-up tables and/or inquiring a memory address according to hierarchical look-up tables. The method can find out a host memory physical address according to a logical address efficiently, and can reduce the consumption of a memory space of a slave device.

Figure 1:
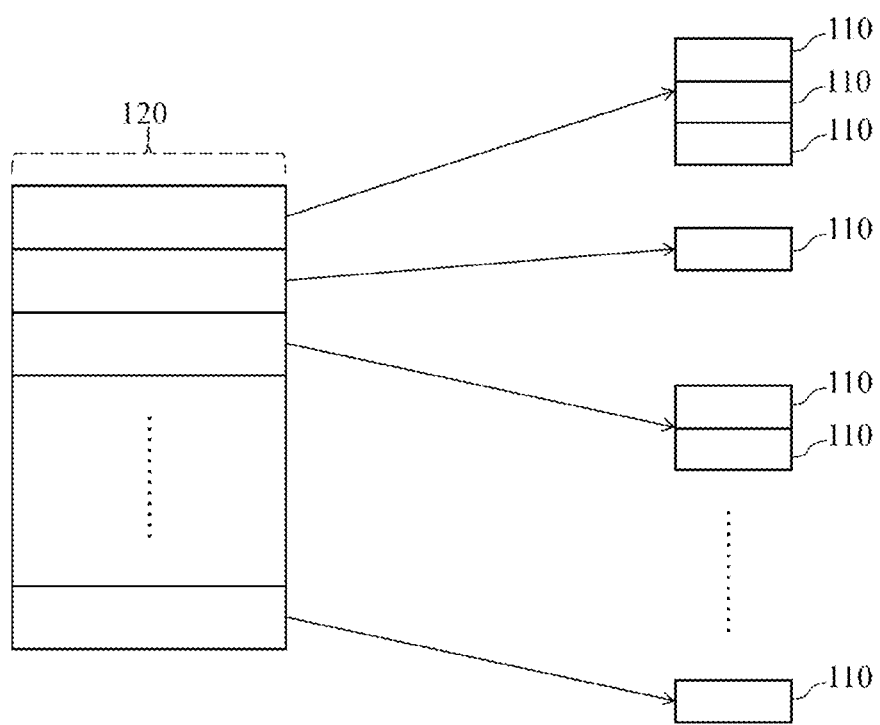
FIG. 1 shows the principle of a host memory buffer (HMB) descriptor list of a prior art.
Figure 2:
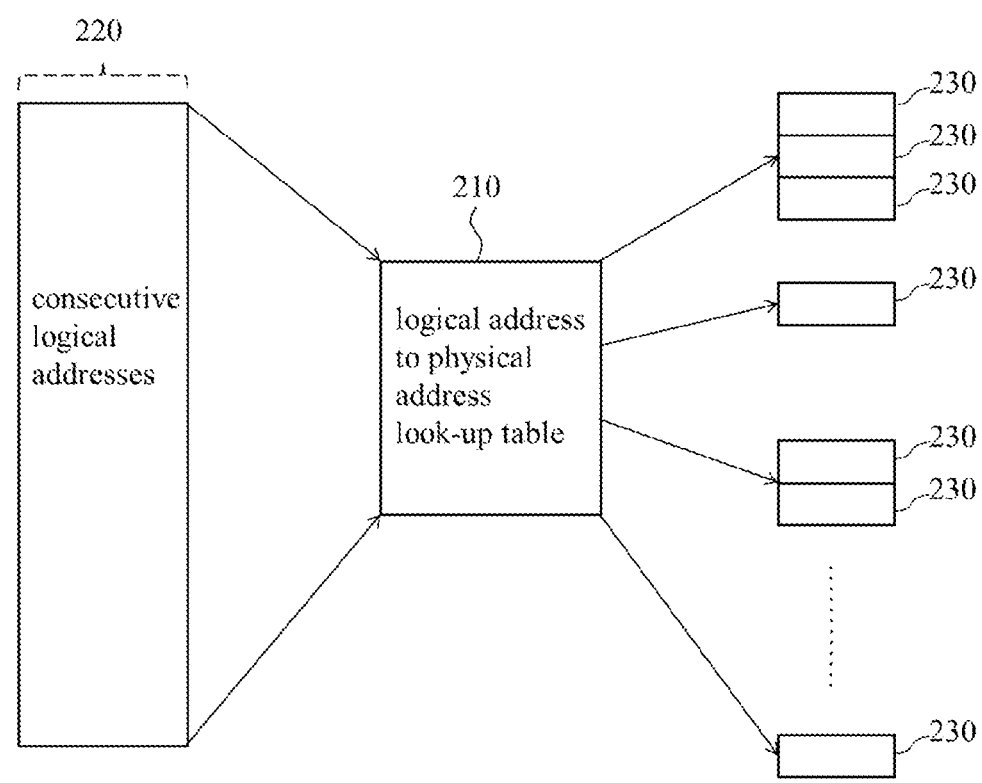
FIG. 2 shows how the firmware of a slave device and the hardware of the slave device in the system of a general system on a chip (SoC) cooperate to access an HMB.
Figure 3:
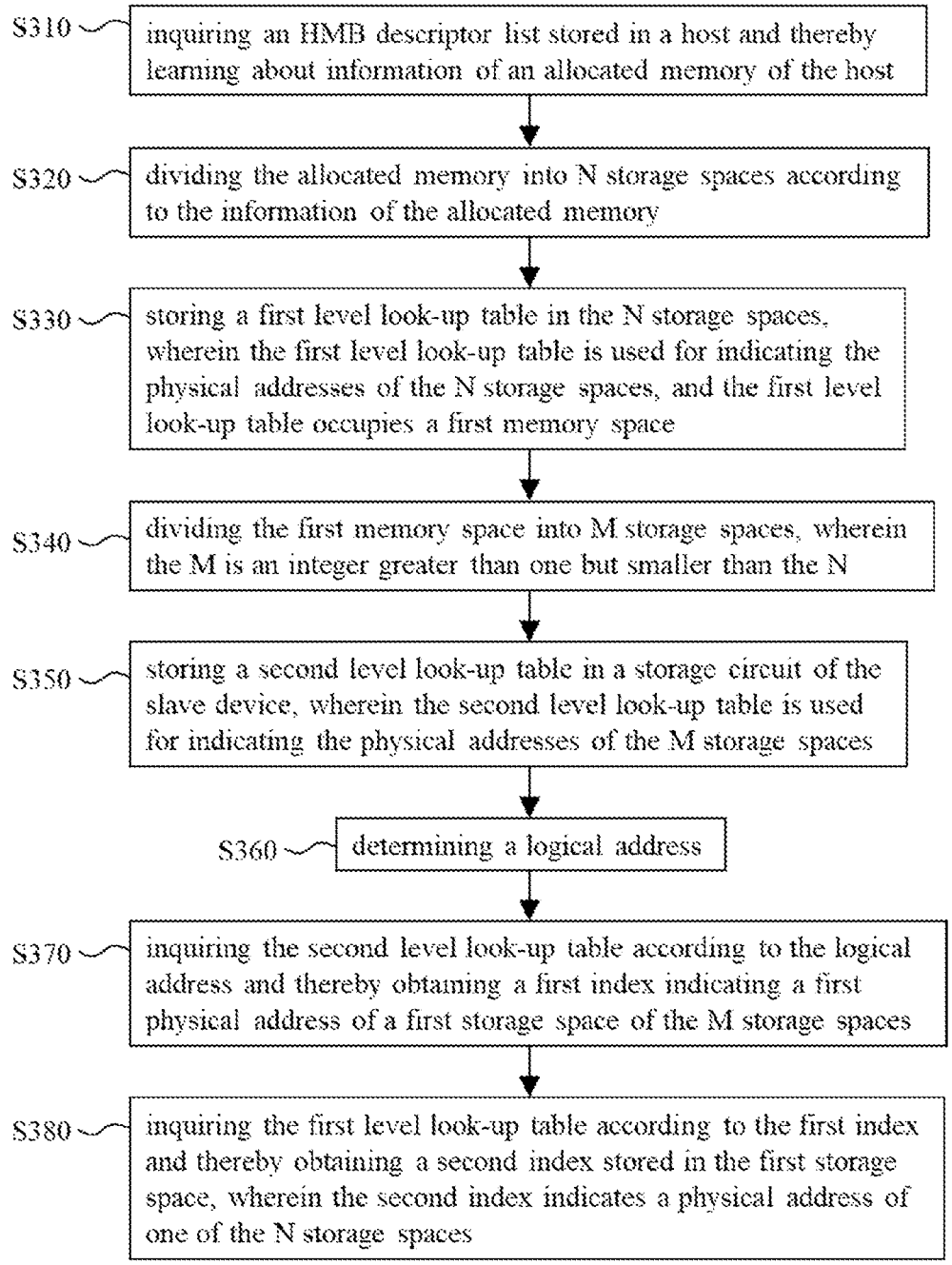
FIG. 3 shows an embodiment of the method of the present disclosure for establishing hierarchical look-up tables and inquiring a memory address accordingly.
Figure 4:
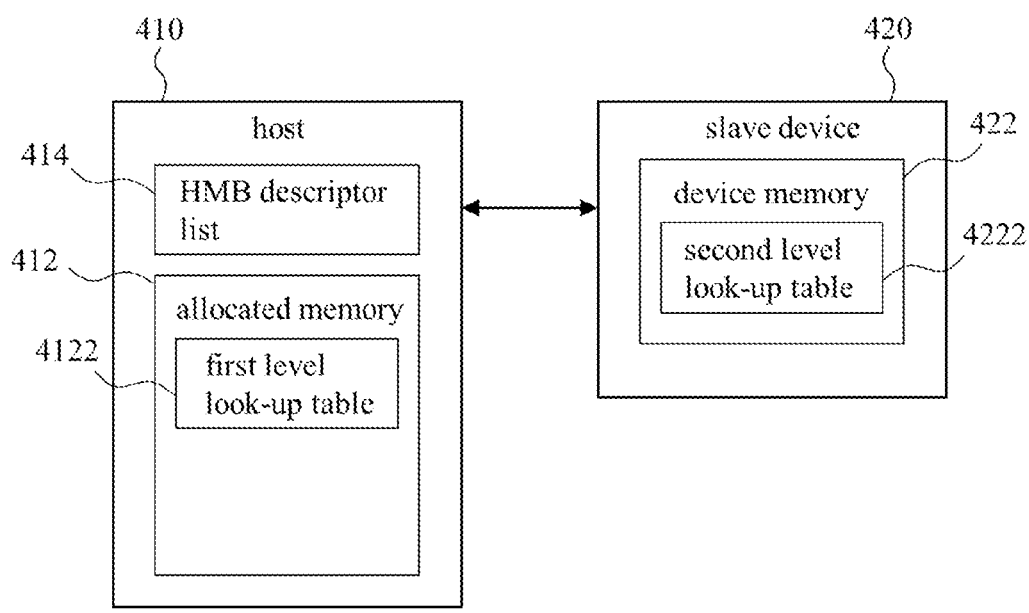
FIG. 4 shows the relation between the host and the slave mentioned in FIG. 3.
Figure 5:
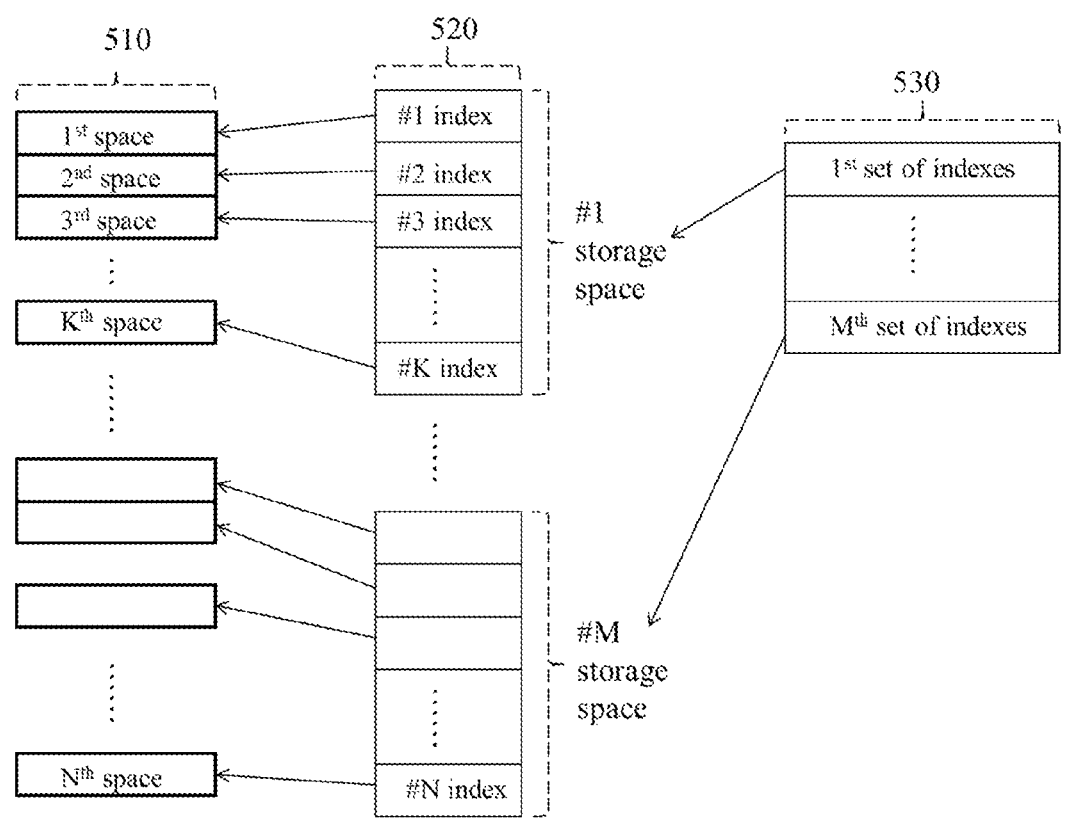
FIG. 5 shows the relation between the allocated memory and the hierarchical look-up tables mentioned in FIG. 3.

FIG. 3 shows an embodiment of the method of the present disclosure for establishing hierarchical look-up tables and inquiring a memory address accordingly. This embodiment is performed by a slave device (e.g., the slave device 420 in FIG. 4) coupled to a host (e.g., the host 410 in FIG. 4), and a relation between the host and the slave device is shown in FIG. 4. The embodiment of FIG. 3 establishes hierarchical look-up tables first, and then inquires a physical address of an allocated memory of the host according to the hierarchical look-up tables. A relation between the allocated memory and the hierarchical look-up tables is shown in FIG. 5. Please refer to FIGS. 3-5. The embodiment of FIG. 3 includes the following steps:

S310: inquiring a host memory buffer descriptor list (HMB descriptor list) stored in the host and thereby learning about information of the allocated memory. In an exemplary implementation, the allocated memory includes scattered memory spaces. In an exemplary implementation, the HMB descriptor list is established by the host in accordance with a Non-Volatile Memory Host Controller Interface Specification. It should be noted that the HMB descriptor list can be stored in the allocated memory of the host or another storage circuit of the host.

S320: dividing the allocated memory into N storage spaces (e.g., the $1^{st}$ space to the $N^{th}$ space of the N storage spaces 510 in FIG. 5) according to the information of the allocated memory, wherein the N is an integer greater than two. In an exemplary implementation, the N storage spaces are equal in size; for example, the size of each of the N storage spaces is equal to the size of the minimum storage unit (e.g., 4096 bytes) specified by the host.

S330: storing a first level look-up table (e.g., the first level look-up table 520 in FIG. 5) in the N storage spaces, wherein the first level look-up table is used for indicating the physical addresses of the N storage spaces, and the first level look-up table occupies a first memory space. For example, the first level look-up table includes N indexes (e.g., the #1 index to the #N index of the first level look-up table 520 in FIG. 5) indicating the physical addresses of the N storage spaces respectively.

S340: dividing the first memory space into M storage spaces (e.g., the #1 storage space to the #M storage space in FIG. 5), wherein the M is an integer greater than one, and the M is smaller than the N. In an exemplary implementation, the M storage spaces are equal in size; for example, the size of each of the M storage spaces is equal to the size of the minimum storage unit (e.g., 4096 bytes) specified by the host. In an exemplary implementation, the N storage spaces are equal in size; the M storage spaces are equal in size; a relation between the N and the M is "$N=K \times (M-1)+P$", the K is a positive integer, and the P is a positive integer not greater than the K; and the M storage spaces store N indexes indicating the physical addresses of the N storage spaces. More specifically, in the above exemplary implementation, the M storage spaces are composed of (M−1) storage space(s) and a remaining storage space (e.g., the $M^{th}$ storage space in FIG. 5); each of the (M−1) storage space(s) includes K index(es); the K index(es) indicate(s) K physical address(es) of K space(s) of the N storage spaces respectively; the remaining storage space includes P index(es); and the P index(es) indicate(s) P physical address(es) of P space(s) of the N storage spaces respectively.

S350: storing a second level look-up table (e.g., the second level look-up table 530 in FIG. 5) in a storage circuit (e.g., the device memory 422 in FIG. 4) of the slave device, wherein the second level look-up table is used for indicating the physical addresses of the M storage spaces. In an exemplary implementation, the second level look-up table occupies a second memory space that is smaller than the aforementioned first memory space, and the consumption of a storage space of the slave device for inquiring a physical address of the allocated memory of the host is low; for example, the above-mentioned second memory space is not greater than one-$K^{th}$ of the aforementioned first memory space, and the K is defined in step S340. In an exemplary implementation, the second level look-up table includes M sets of indexes (e.g., the $1^{st}$ set of indexes to the $M^{th}$ set of indexes of the second level look-up table 530 in FIG. 5), and each set of indexes indicates K index(es)/P index(es) stored in one of the M storage spaces. In an exemplary implementation, the second level look-up table is a logical-to-physical address mapping table for translating a logical address into a physical address.

S360: determining a logical address. For example, the logical address is determined by the operation of the slave device.

S370: inquiring the second level look-up table according to the logical address and thereby obtaining a first index (e.g., any index stored in the second level look-up table 530 of FIG. 5) indicating a first physical address of a first storage space of the M storage spaces. In an exemplary implementation, the first storage space stores K index(es), each index is stored at a storage location corresponding to a physical address, and the first physical address is one of K physical address(es) corresponding to the K index(es). In an exemplary implementation, the first index itself is the first physical address or the information thereof. It should be noted that the terms "first" and "second" mentioned in the embodiment of FIG. 3 are merely used for naming without any intention to limit the implementation of this embodiment.

S380: inquiring the first level look-up table according to the first index and thereby obtaining a second index (e.g., any index stored in the first level look-up table 520 of FIG. 5) stored in the first storage space, wherein the second index indicates a physical address of one of the N storage spaces. In an exemplary implementation, the second index itself is the physical address or the information thereof. In an exemplary implementation, based on the definitions of N, M, K, P as mentioned in the preceding steps, the embodiment of FIG. 3 needs M times of decision operations at most to select a first index from M sets of indexes indicating the physical address of the first storage space according to a logical address, and needs K times of decision operations at most to select a second index from K index(es) indicating the physical address of one of the N storage spaces according to the first index. Compared with this exemplary implementation, the prior art needs "N=K×(M−1)+P>>M+K" times of decision operations at most to find out one of N indexes corresponding to a logical address. In light of the above, the above-mentioned exemplary implementation is more efficient than the prior art.

Please refer to FIG. 4. According to FIG. 4 and the description in the preceding paragraphs, the allocated memory 412 is a memory of the host 410, the HMB descriptor list 414 and the first level look-up table 4122 is stored in the host 410, and the second level look-up table 4222 is stored in a device memory 422 of the slave device 420. It should be noted that the roles of the host 410 and the slave device 420 are determined according to the transmission protocol (e.g., the NVMe protocol) between them. It should also be noted that after the physical address of one of the N storage spaces is obtained according to the second index, the slave device 420 can request the host 410 for a read/write operation and then access the allocated memory 412.

Figure 6:
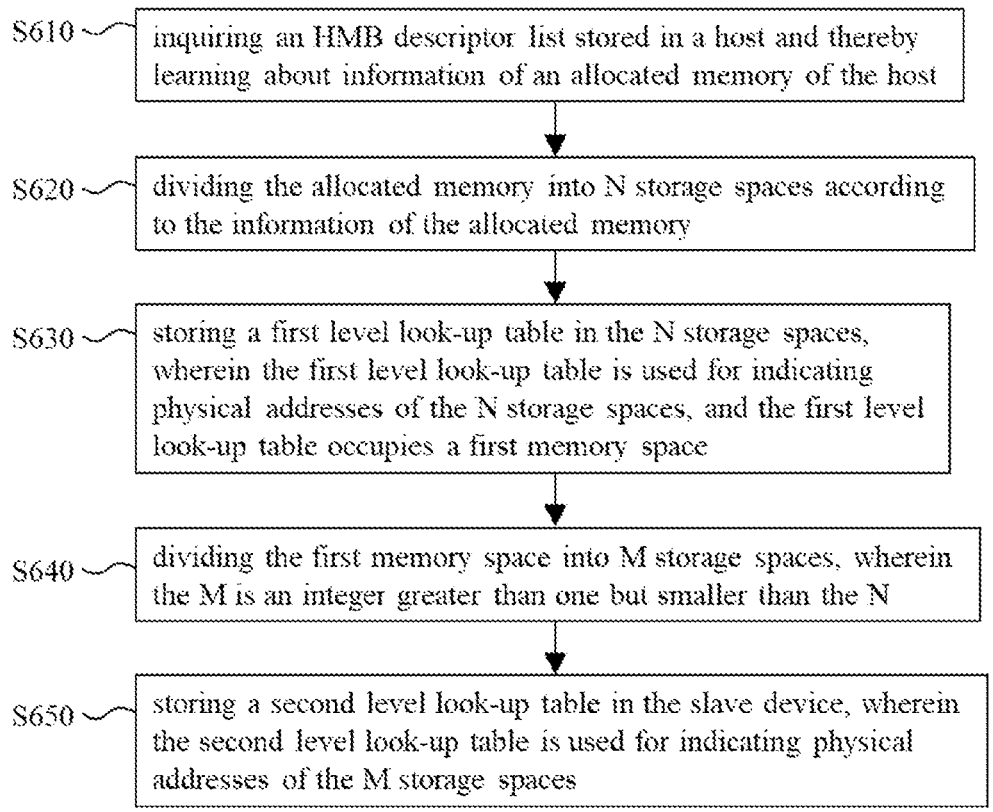
FIG. 6 shows an embodiment of the method of the present disclosure for establishing hierarchical look-up tables.

The method of FIG. 3 can be divided into a first method (i.e., steps S310~S350 in FIG. 3) for establishing hierarchical look-up tables that are used for inquiring a host memory address and a second method (i.e., steps S360~S380 in FIG. 3) for inquiring a host memory address according to hierarchical look-up tables. Each of the first and second methods can be performed independently, and can be performed along with other known/self-developed look-up table establishment methods or memory address inquiry methods. An embodiment of the first method is shown in FIG. 6. This embodiment is for establishing hierarchical look-up tables that are used for inquiring a physical address of an allocated memory of a host, and is performed by a slave device coupled to the host. The embodiment of FIG. 6 includes the following steps:

S610: inquiring a host memory buffer descriptor list (HMB descriptor list) stored in the host and thereby learning about information of the allocated memory;

S620: dividing the allocated memory into N storage spaces according to the information of the allocated memory, wherein the N is an integer greater than two;

S630: storing a first level look-up table in the N storage spaces, wherein the first level look-up table is used for indicating physical addresses of the N storage spaces, and the first level look-up table occupies a first memory space;

S640: dividing the first memory space into M storage spaces, wherein the M is an integer greater than one, and the M is smaller than the N; and S650: storing a second level look-up table in the slave device, wherein the second level look-up table is used for indicating physical addresses of the M storage spaces.

Figure 7:
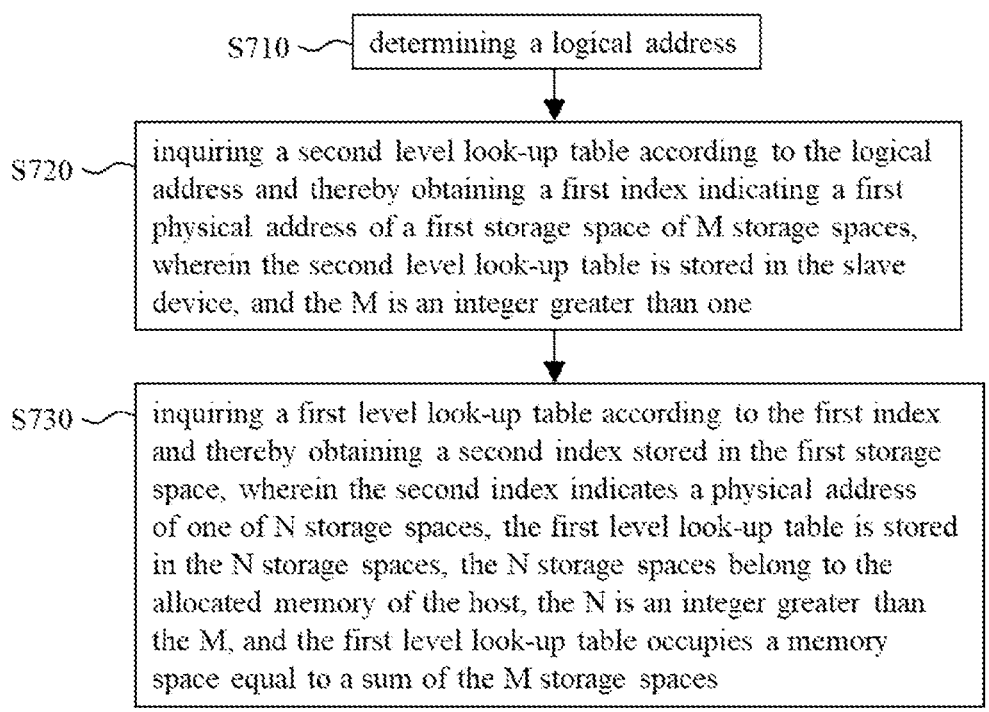
FIG. 7 shows an embodiment of the method of the present disclosure for inquiring a memory address according to hierarchical look-up tables.

An embodiment of the aforementioned second method is shown in FIG. 7. This embodiment is used for inquiring a physical address of an allocated memory of a host according to hierarchical look-up tables, and is performed by a slave device coupled to the host. The embodiment of FIG. 7 includes the following steps:

S710: determining a logical address;

S720: inquiring a second level look-up table according to the logical address and thereby obtaining a first index indicating a first physical address of a first storage space of M storage spaces, wherein the second level look-up table is stored in the slave device, and the M is an integer greater than one; and S730: inquiring a first level look-up table according to the first index and thereby obtaining a second index stored in the first storage space, wherein the second index indicates a physical address of one of N storage spaces, the first level look-up table is stored in the N storage spaces, the N storage spaces belong to the allocated memory of the host, the N is an integer greater than the M, and the first level look-up table occupies a memory space equal to a sum of the M storage spaces.

Since those of ordinary skill in the art can appreciate the detail and the modification of the embodiments of FIGS. 6-7 by referring to the disclosure of the embodiments of FIGS. 3-5, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

To sum up, the method of the present disclosure can find out a host memory physical address according to a logical address efficiently, and can reduce the consumption of a memory of a slave device.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for establishing hierarchical look-up tables and inquiring a physical address of an allocated memory of a host according to the hierarchical look-up tables, the method being performed by a slave device coupled to the host and comprising:

inquiring a host memory buffer descriptor list (HMB descriptor list) stored in the host and thereby learning about information of the allocated memory;

dividing the allocated memory into N storage spaces according to the information of the allocated memory, wherein the N is an integer greater than two;

storing a first level look-up table in the N storage spaces, wherein the first level look-up table is used for indicating physical addresses of the N storage spaces, and the first level look-up table occupies a first memory space;

dividing the first memory space into M storage spaces, wherein the M is an integer greater than one, and the M is smaller than the N;

storing a second level look-up table in the slave device, wherein the second level look-up table is used for indicating physical addresses of the M storage spaces;

determining a logical address;

inquiring the second level look-up table according to the logical address and thereby obtaining a first index indicating a first physical address of a first storage space of the M storage spaces; and inquiring the first level look-up table according to the first index and thereby obtaining a second index stored in the first storage space, wherein the second index indicates a physical address of one of the N storage spaces, wherein the N storage spaces are equal in size; the M storage spaces are equal in size; a relation between the N and the M is N=K×(M−1)+P, the K is a positive integer, and the P is a positive integer not greater than the K; the M storage spaces are composed of (M−1) storage space(s) and a remaining storage space; each of the (M−1) storage space(s) includes K index(es); the K index(es) indicate(s) K physical address(es) of K storage space(s) of the N storage spaces respectively; the remaining storage space includes P index(es); and the P index(es) indicate(s) P physical address(es) of P storage space(s) of the N storage spaces respectively.

2. The method of claim 1, wherein the allocated memory includes a plurality of scattered memory spaces.

3. The method of claim 1, wherein the HMB descriptor list is established by the host in accordance with a Non-Volatile Memory Host Controller Interface Specification.

4. The method of claim 1, wherein the N storage spaces are equal in size.

5. The method of claim 1, wherein the M storage spaces are equal in size.

6. The method of claim 1, wherein the second level look-up table occupies a second memory space, and the second memory space is smaller than the first memory space.

7. A method for establishing hierarchical look-up tables that are used for inquiring a physical address of an allocated memory of a host, the method being performed by a slave device coupled to the host and comprising:

inquiring a host memory buffer descriptor list (HMB descriptor list) stored in the host and thereby learning about information of the allocated memory;

dividing the allocated memory into N storage spaces according to the information of the allocated memory, wherein the N is an integer greater than two;

storing a first level look-up table in the N storage spaces, wherein the first level look-up table is used for indicating physical addresses of the N storage spaces, and the first level look-up table occupies a first memory space;

dividing the first memory space into M storage spaces, wherein the M is an integer greater than one, and the M is smaller than the N; and storing a second level look-up table in the slave device, wherein the second level look-up table is used for indicating physical addresses of the M storage spaces, wherein the N storage spaces are equal in size; the M storage spaces are equal in size; a relation between the N and the M is N=K×(M−1)+P, the K is a positive integer, and the P is a positive integer not greater than the K; the M storage spaces are composed of (M−1) storage space(s) and a remaining storage space; each of the (M−1) storage space(s) includes K index(es); the K index(es) indicate(s) K physical address(es) of K storage space(s) of the N storage spaces respectively; the remaining storage space includes P index(es); and the P index(es) indicate(s) P physical address(es) of P storage space(s) of the N storage spaces respectively.

8. The method of claim 7, wherein the allocated memory includes a plurality of scattered memory spaces.

9. The method of claim 7, wherein the HMB descriptor list is established by the host in accordance with a Non-Volatile Memory Host Controller Interface Specification.

10. The method of claim 7, wherein the N storage spaces are equal in size.

11. The method of claim 7, wherein the M storage spaces are equal in size.

12. The method of claim 7, wherein the second level look-up table occupies a second memory space, and the second memory space is smaller than the first memory space.

13. A method for inquiring a physical address of an allocated memory of a host according to hierarchical look-up tables, the method being performed by a slave device coupled to the host and comprising:

determining a logical address;

inquiring a second level look-up table according to the logical address and thereby obtaining a first index indicating a first physical address of a first storage space of M storage spaces, wherein the second level look-up table is stored in the slave device, and the M is an integer greater than one; and inquiring a first level look-up table according to the first index and thereby obtaining a second index stored in the first storage space, wherein the second index indicates a physical address of one of N storage spaces, the first level look-up table is stored in the N storage spaces, the N storage spaces belong to the allocated memory of the host, the N is an integer greater than the M, and the first level look-up table occupies a memory space equal to a sum of the M storage spaces, wherein the N storage spaces are equal in size; the M storage spaces are equal in size; a relation between the N and the M is N=K×(M−1)+P, the K is a positive integer, and the P is a positive integer not greater than the K; the M storage spaces are composed of (M−1) storage space(s) and a remaining storage space; each of the (M−1) storage space(s) includes K index(es); the K index(es) indicate(s) K physical address(es) of K storage space(s) of the N storage spaces respectively; the remaining storage space includes P index(es); and the P index(es) indicate(s) P physical address(es) of P storage space(s) of the N storage spaces respectively.

14. The method of claim 13, wherein the allocated memory includes a plurality of scattered memory spaces.

15. The method of claim 13, wherein the HMB descriptor list is established by the host in accordance with a Non-Volatile Memory Host Controller Interface Specification.

16. The method of claim 13, wherein the N storage spaces are equal in size.

17. The method of claim 13, wherein the M storage spaces are equal in size.

* * * * *